H. WAKEMAN.
FLEXIBLE TUBING.

No. 188,446. Patented March 13, 1877.

Witnesses:
Chas. H. Smith
Harold Serrell

Inventor
Harwood Wakeman.
per Lemuel W. Serrell
Atty

UNITED STATES PATENT OFFICE.

HARWOOD WAKEMAN, OF NEW YORK, N. Y.

IMPROVEMENT IN FLEXIBLE TUBING.

Specification forming part of Letters Patent No. 188,446, dated March 13, 1877; application filed August 15, 1876.

*To all whom it may concern:*

Be it known that I, HARWOOD WAKEMAN, of the city and State of New York, have invented an Improvement in Flexible Tubing, of which the following is a specification:

India-rubber and other flexible tubing has heretofore been made use of for conveying fluids, for driving engines and rock drills in mines, and for connecting the tubes upon railway-cars where air-brakes are employed. Under these circumstances the flexible tubing is subjected to heavy pressure, strain, or wear, and if the tube breaks it generally occurs at a time when it is most required, and sometimes fatal consequences ensue.

My present invention relates to a flexible metallic armor applied to and combined with a flexible tube in such a manner as to relieve the tube from longitudinal strain or from internal pressure, or from the wear resulting from the handling of the tube and moving it from place to place. The flexible metallic armor also prevents the tube collapsing by a vacuum action.

Figure 1:
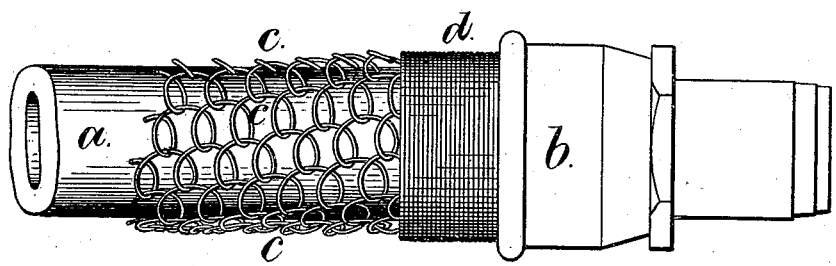
Figure 2:
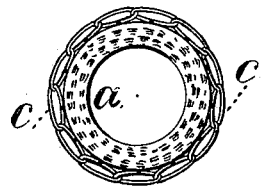

In the drawing, Figure 1 is an external view of the tube and armor, and Fig. 2 is a longitudinal section of the same.

The india-rubber or other flexible tube $a$ is of any suitable construction, and I have shown the same as connected at one end to a metallic coupling, $b$.

The flexible metallic armor is made of ranges of metallic wire helices or springs, connected to each other, flattened and drawn around the pipe, the edges being united by a lacing of wire or by a helix introduced to join the adjacent helices. This forms a very strong and flexible armor that yields when the tube is coiled or bent, and straightens the tube when unwound; it prevents the tube touching and wearing against any other substance; it supports the tube both longitudinally and peripherally, and maintains the cylindrical shape of the tube, whether under pressure or vacuum action.

This flexible metallic armor is shown at $c$, and one end thereof is secured to the metallic coupling $b$ by the binding-wire $d$, or otherwise.

I do not claim a helix surrounding the flexible tube, and of corresponding diameter to the exterior thereof, whether the same is covered or not.

I claim as my invention—

The flexible tubing, composed of a flexible hose and a surrounding flexible resilient metallic armor, consisting of interlaced ranges of springs, substantially as specified.

Signed by me this 14th day of August, A. D., 1876.

HARWOOD WAKEMAN.

Witnesses:
GEO. T. PINCKNEY,
CHAS. H. SMITH.